June 13, 1950   H. C. NOE   2,510,997
SAUSAGE LINK AND TIE FORMING MEANS
Filed March 30, 1946   6 Sheets-Sheet 3

INVENTOR.
HAROLD C NOE
BY
Ernest A. Joersen
ATTORNEY

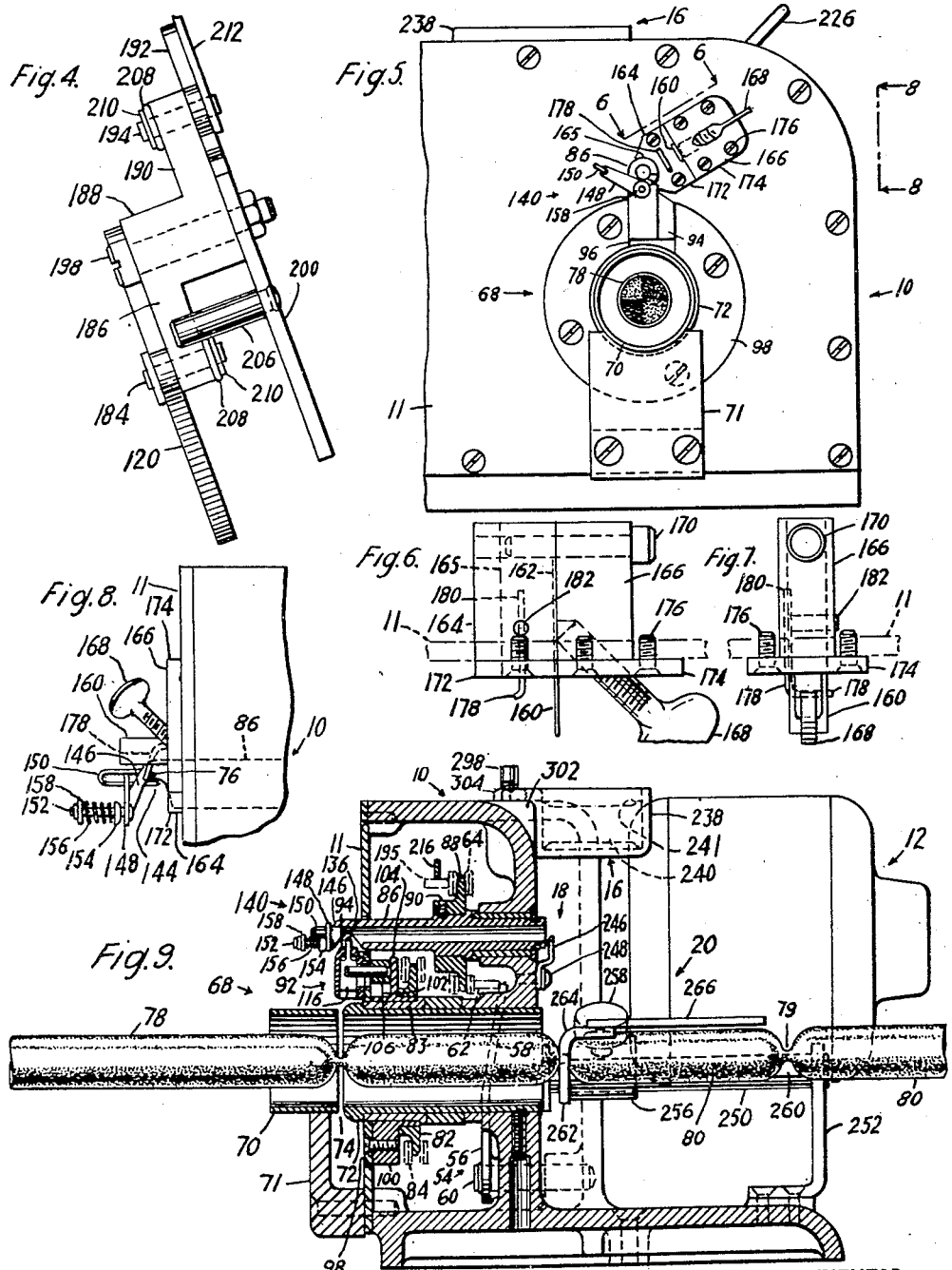

June 13, 1950 H. C. NOE 2,510,997
SAUSAGE LINK AND TIE FORMING MEANS
Filed March 30, 1946 6 Sheets-Sheet 5
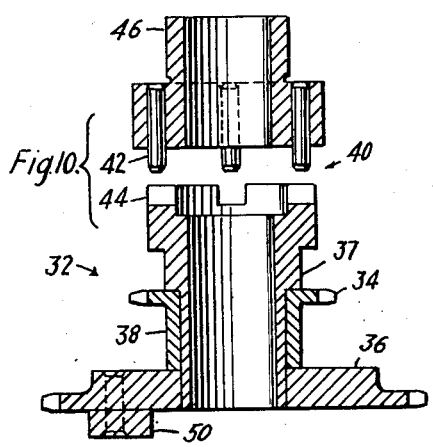
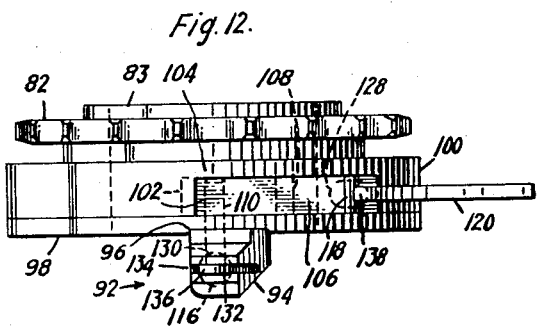
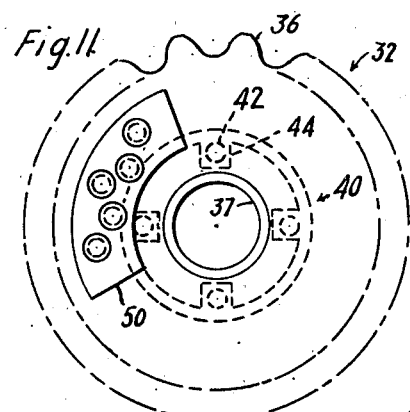
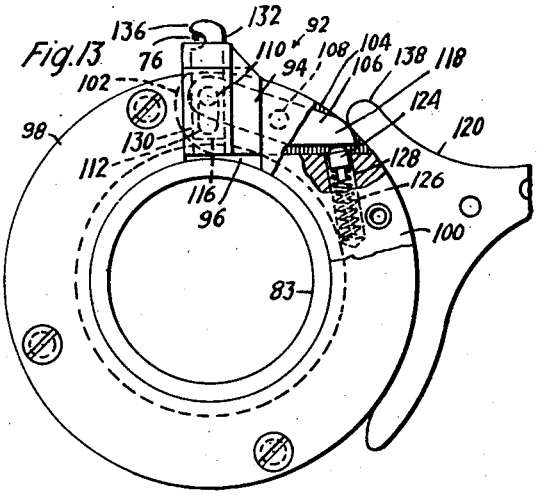
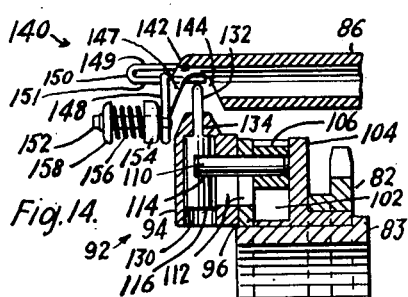
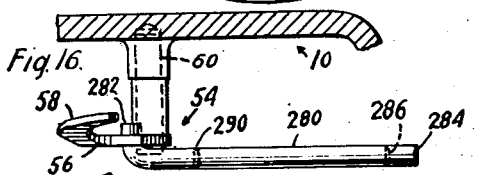
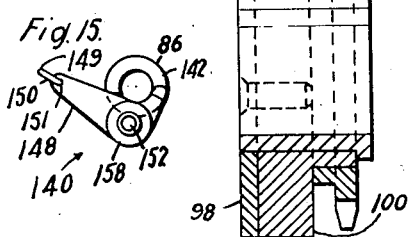
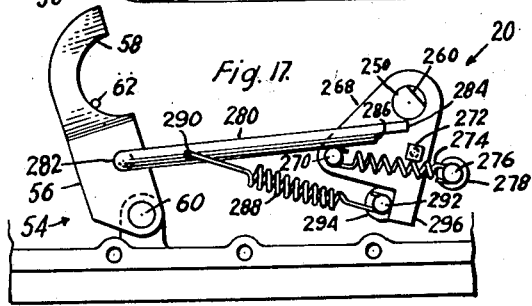
INVENTOR.
HAROLD C. NOE
BY
Ernest A. Jensen
ATTORNEY

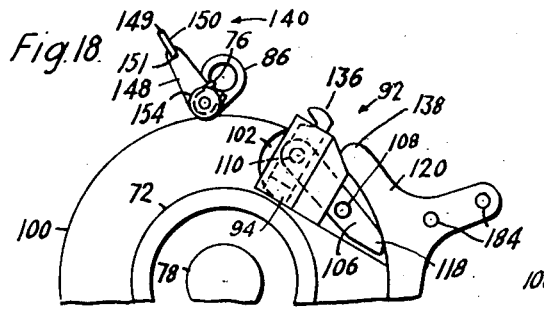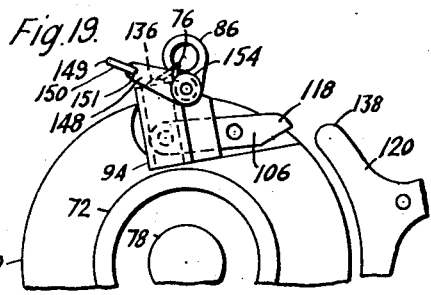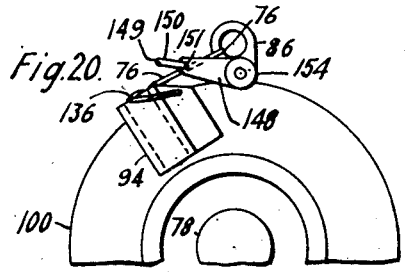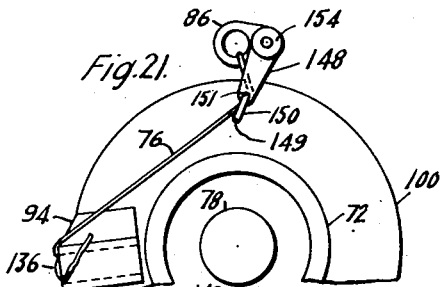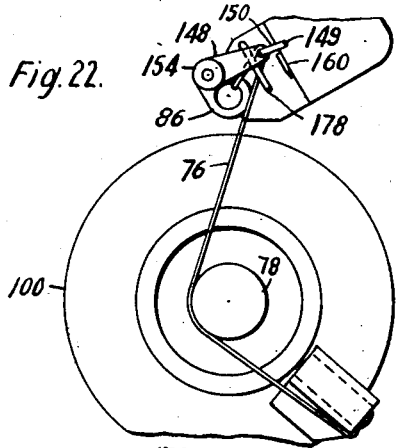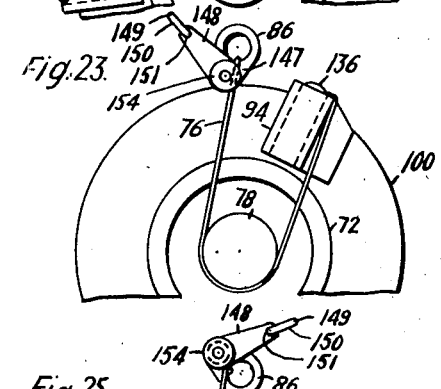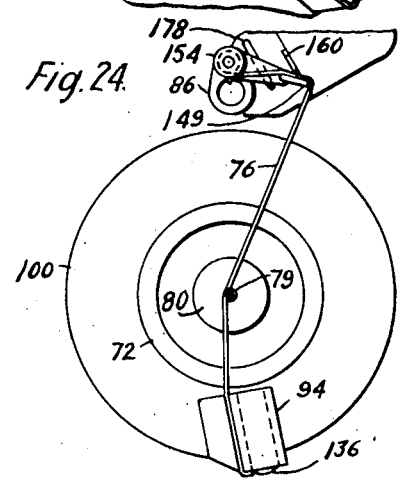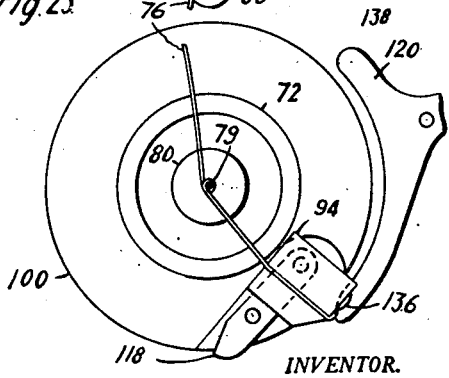

Patented June 13, 1950

2,510,997

UNITED STATES PATENT OFFICE 2,510,997

SAUSAGE LINK AND TIE FORMING MEANS

Harold C. Noe, Upper Montclair, N. J., assignor to Kidde Manufacturing Co., Inc., Bloomfield, N. J., a corporation of New Jersey Application March 30, 1946, Serial No. 658,451

16 Claims. (Cl. 17—34)

1

This invention relates to means for forming links and ties between the links in sausage and articles of like formation.

An object of the invention is to provide a machine that is particularly well adapted to effect ties in sausage having a cover of material adapted to be removed, such as cellophane, and where the cover material untwists or is otherwise displaced when it is attempted to form the ties by twisting.

Another object is to provide improved means for directly effecting a tie which facilitate and render the operation more effective.

Another object is to provide a small portable sausage linking unit operable by hand or power means.

Another object is to provide a unit for effecting a plurality of ties simultaneously or otherwise.

Another object is to provide a device of the foregoing character having means for measuring the length of the links which is effective for controlling the operation of means for starting and stopping the machine.

Another object is to provide a machine of the above-indicated character that is simple and durable in construction, economical to manufacture, and effective in its operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein:

Figure 4 is an enlarged detail view taken substantially in the direction of the line 4—4 at the right of Figure 2.

Figure 5 is a front elevational view of a portion of the machine.

Figure 6 is an enlarged detail view taken substantially in the direction of the line 6—6 of Figure 5.

Figure 7 is an end elevation of Figure 6.

Figure 8 is an enlarged detail view taken substantially in the direction of the line 8—8 of Figure 5.

Figure 9 is a view, partially in section and partially in elevation, taken substantially along the line 9—9 of Figure 2, but on a reduced scale.

Figure 10 is an enlarged detail sectional view taken substantially along the line 10—10 of Figure 2 of clutch elements in declutched position, which elements are shown in clutched position near the left of the center of Figure 3.

Figure 11 is a front elevational view of parts of Figure 10.

Figure 12 is an enlarged detail top plan view of parts shown at the lower right of Figure 3.

Figure 13 is a front elevation of the parts of Figure 12, and as seen at the right of Figure 2.

Figure 14 is an enlarged detail side view, generally in section, of parts as shown at the left of Figure 9.

Figure 15 is a detail end elevational view, taken from the left, of parts shown at the top of Figure 14.

Figure 16 is a detail top plan view of portions of a sub-assembly of the machine shown in Figure 17.

Figure 17 is a front elevational view on a reduced scale of parts seen at the lower left and center of Figure 2, but in different operative positions.

Figures 18 to 25, are schematic views, illustrating the operation of the tie forming means.

Figure 1:
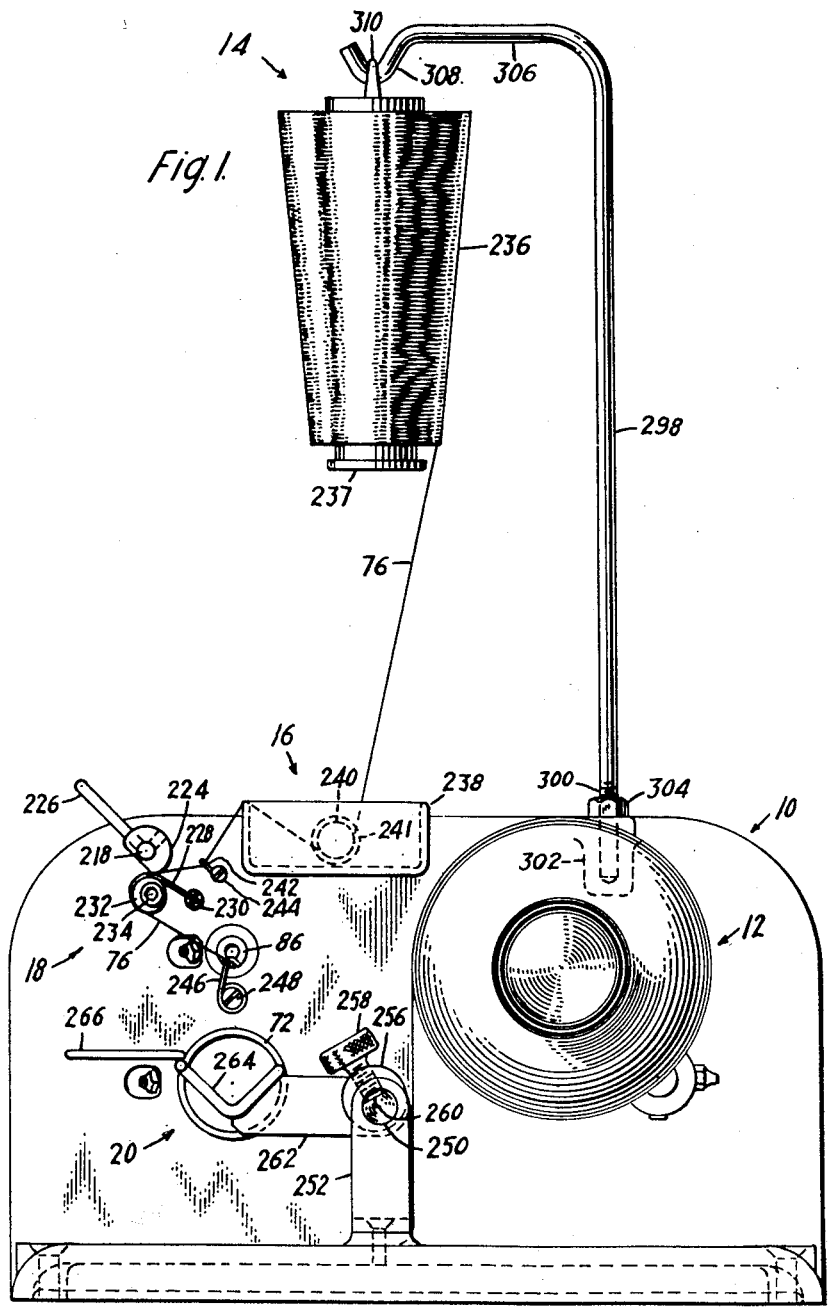
Figure 1 is a rear elevational view of a machine embodying the invention.
Figure 2:
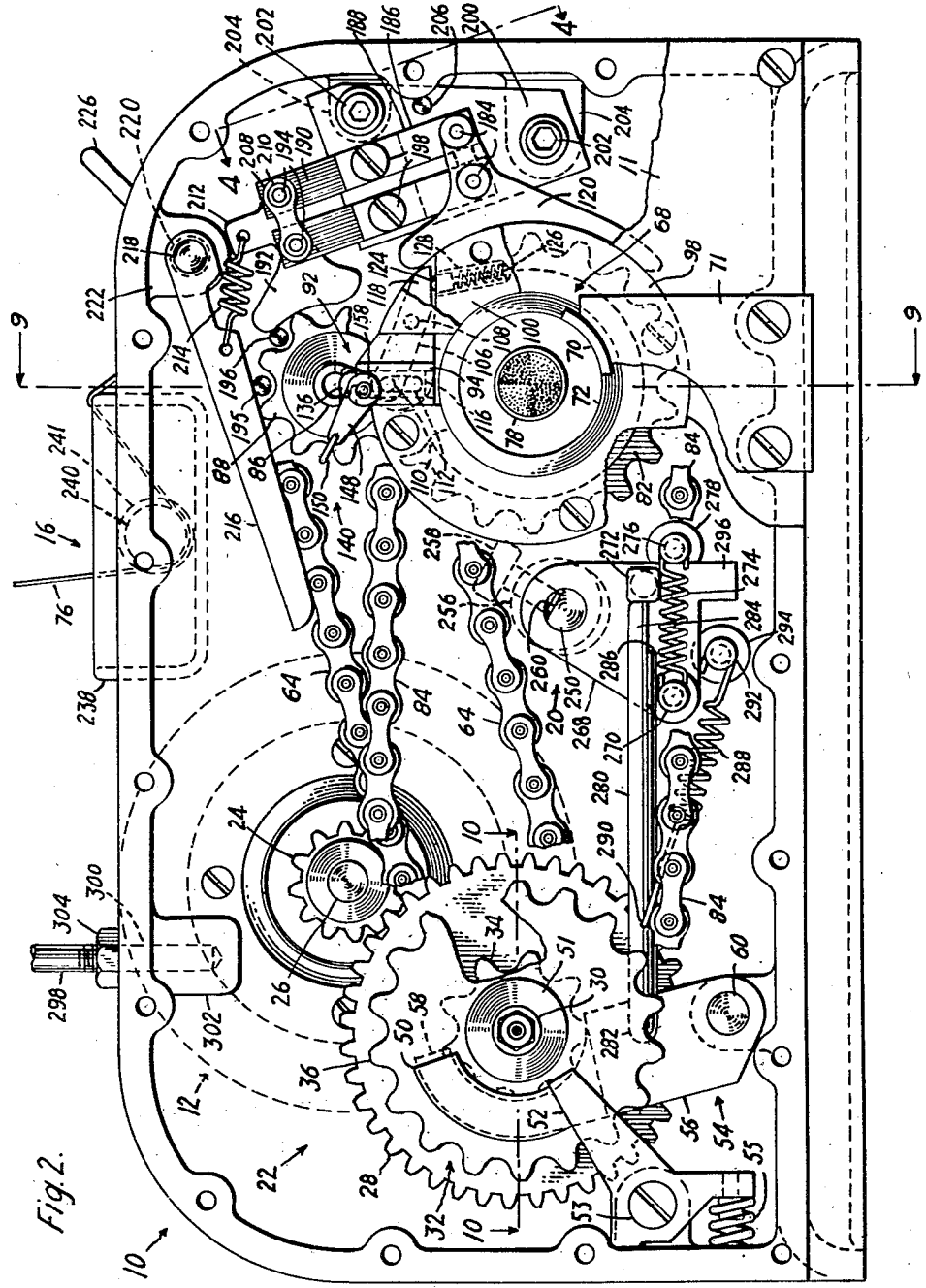
Figure 2 is a front view, on an enlarged scale, of the main body of the machine of Figure 1, portions of a front cover, and of sprocket chains and other elements, having been broken away or omitted.
Figure 3:
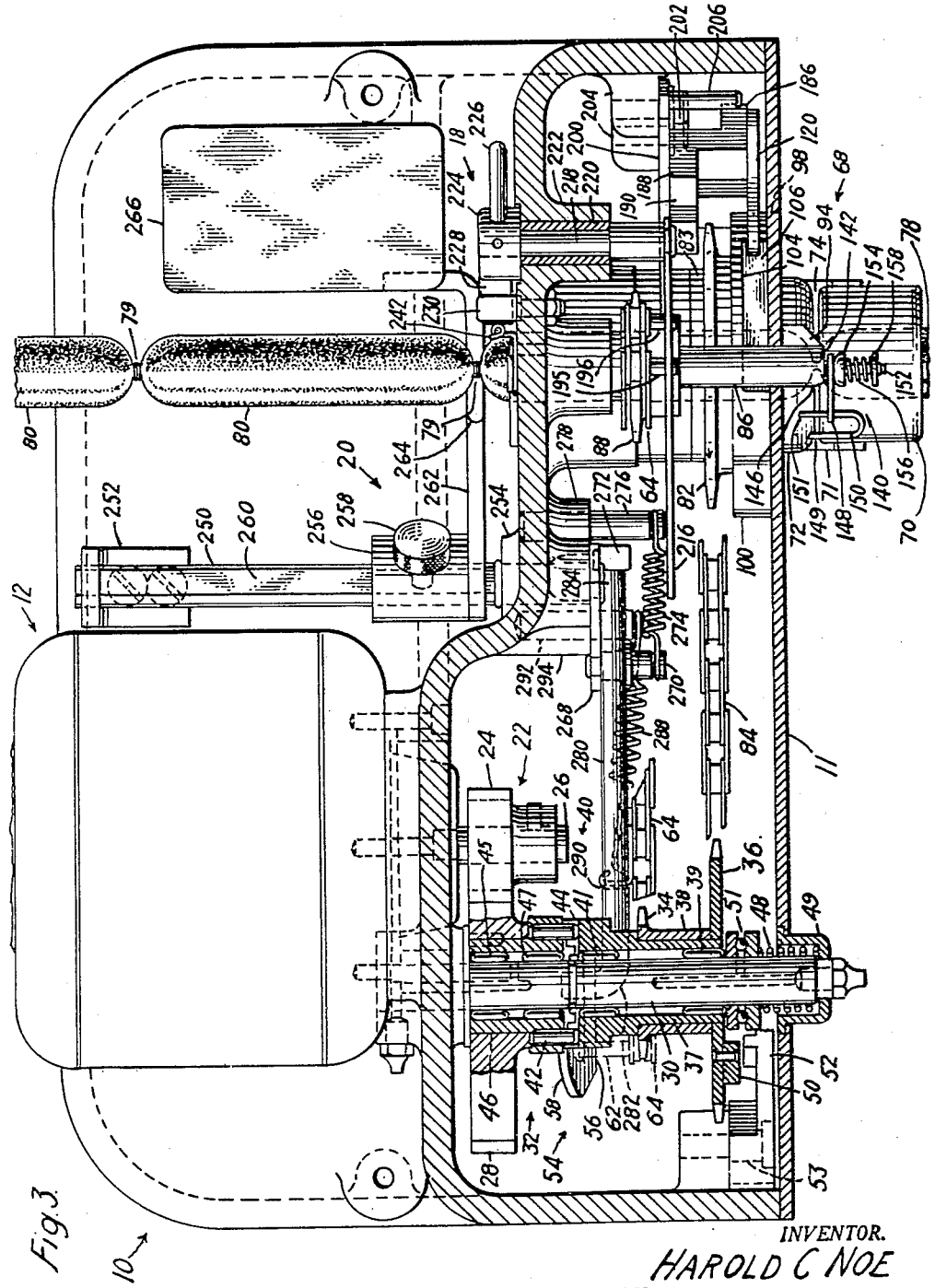
Figure 3 is a top view of the machine, certain parts being in elevation, others in section and further parts having been broken away or omitted.

Referring to the drawings, particularly to Figures 1, 2, 3, 5 and 9, the machine comprises, in general, a housing 10 having a main front cover plate 11, a motor 12 at the rear of the machine, thread supply means 14, thread moistening means 16, thread control and guide means 18, a combined sausage link length measuring and machine starting assembly 20, and rotative driving means 22 including a pinion 24 on a shaft 26 of the motor 12 and a gear 28 rotatively mounted on a shaft 30 fixed to the housing 10. Rotative operating means 32 includes a control sprocket 34 and an operating sprocket 36 fixed to each other, as by sleeves 37 and 38, and rotatively mounted, by needle bearing means 39 and 41, on the shaft 30 (Figure 3).

A clutch assembly 40, (Figure 10) comprises clutch elements or pins 42 carried by a sleeve 46 fixed to the gear 28 and cooperating clutch elements or shoulders 44 carried by the sleeve bearing 37. The sleeve 46 is mounted on needle bearings 46 and 47 on the fixed shaft 30 (Figure 1). Spring means 48, operating between a cap 49 on the cover plate 11 and a thrust bearing 51, urges the clutch elements 44 towards clutched position relative to the clutch elements 42.

Stop shoe means 50, in the form of a flat plate of substantially C-shape, is secured to the front side of the sprocket 36 of the driving means 32 for cooperation with stationary stop arm means 52 for stopping the driving means 32 when the clutch elements 44 are released from the clutch elements 42. The arm 52 is pivotally mounted on a boss of the housing 10 by a pin 53 and is adapted for limited shock-absorbing movement against a spring 55.

Movable cam means 54, pivotally mounted by a pin 60 on a boss of the housing 10, is associated with the clutch means 40 and, as shown in Figures 2, 3, 9, 16 and 17, comprises a cam in the form of a lever arm 56 having an upper end 58 of substantially C-shape bent rearwardly for cooperation with a control pin 62, indicated in broken lines in Figures 3 and 9 at the rear side of a control chain 64.

Passageway or sleeve means 68 for receiving sausage comprises, in this instance, an entrance and sleeve 70 supported by a bracket 71 secured to the housing 10 at the front of the machine, and a sausage receiving and exit sleeve 72 disposed in slightly spaced aligned end-to-end relation to the entrance sleeve 70 to form a tie gap 74, in which a thread 76 from the supply means 14 is wrapped around a sausage blank 78 (Figures 3 and 9) to form constricted portions or ties 79 between sausage links 80, as will be further explained hereinafter. The entrance sleeve 70 may be omitted for certain applications.

A driven sprocket 82 (Figures 2, 3, 9, 12 and 14) is fixed to a sleeve 83 journaled on the sausage receiving sleeve 72, and is connected to the operating sprocket 36 by an operating chain 84, which is merely for driving purposes and, in this instance, has no pins, such as the pin 62 on the control chain 64, or other attachments.

A hollow rotative spindle 86, above the top side of the sleeve means 68 and parallel thereto, carries a second control sprocket 88 fixed thereto, as by a pin 90 (Figure 9) and is connected to the first control sprocket 34 by the control chain 64.

Thread gripping means 92 (Figures 9, 12, 13, 14 and 15) comprises a small plunger housing 94 fixed in position in a depression 96 in a washer-like cover plate 98 secured to a collar 100 which is fixed to the sleeve 83 on the sausage receiving sleeve 72.

As shown in Figures 12, 13 and 14, the collar 100 has a recess 102 which is closed at the front side by the cover plate 98 and at the rear side by a portion 104 of the collar 100, in which recess 102 is positioned a thread gripper cam lever 106 pivotally carried on a pin 108. The lever 106 at one end has a fixed pin 110 which extends laterally forwardly from the lever 106 through registering slots 112 in the plunger housing 94 and the cover plate 98, respectively, and into a side recess 114 (Figure 14) of a plunger 116 in the plunger housing 94. At its other end, the lever 106 has a tip 118 which cooperates with a cam shoe 120 and is normally biased counterclockwise (Figures 2 and 13) by a button 124 and a spring 126 in a recess 128 of the collar 100.

The body of the plunger 116 is of generally cylindrical form, has the side recess 114 formed therein, is longitudinally slidably mounted in a bore 130 of the plunger housing 94, and has an upper flat plate-like extension 132 projecting through a slot 134 of the housing 94, which extension 132 has thread carrying means in the form of a thread gripper or hook-like upper end portion 136. As shown in Figure 13, the gripper 136 is at a position in the counterclockwise rotation of the collar 100, in which it is about to grip the thread 76, which it does when the tip 118 passes an end 138 of the cam shoe 120 and the spring 126 forces the tip 118 upwardly and the gripper 136 downwardly about the axis of the pin 108, whereby the thread is gripped between the hook 136 and the top of the plunger housing 94.

Thread feeding means 140 (Figure 14) includes a front end portion 142 of the hollow spindle 86 forming a side recess 144 to clear the extension 132 of the plunger 116 and a forward element 147, like a partial screw or helix turn, having, at its outer end, a fixed threader plate or arm 148. The outer end of the arm has fixed thereto a laterally extending element 150 of substantially U-shape, having a short radially outer leg 149 and a long inner leg 151.

A pin 152 fixed to the arm 148 carries a movable inner end washer 154 which is biased toward the arm 148 by a spring 156 surrounding the pin 152 and acting between the washer 154 and a fixed washer 158 at the outer end of the pin 152. The washer 154 cooperates with the arm 148 to anchor the leading end of the thread 76.

As seen in Figures 5, 6, 7 and 8, a knife 160 is held in a recess 162 in a knife-holder block 164 next to a back-up block 166 in which a thumb screw 168 is adapted to engage and hold the knife 160. The blocks 164 and 166 are connected by a screw 170 and have front flanges 172 and 174, respectively, secured to the main cover plate 11, as by screws 176, the block 164 having an arcuate recess 165 by which it partially embraces the hollow spindle 86. A stripper hook or wire 178, at the front of the block 164 adjacent to the thread feeding means 140, slopes upwardly and inwardly from its free end at a position outside the thread 76 toward the housing 10 (Figure 8) and has a shank portion 180 extending into and held in the block 164, as by a set screw 182 (Figure 6).

Referring to Figures 2, 3, and 4, the cam shoe 120 is pivotally mounted, as by a pair of pins 184, on forward legs 186 of a pair of parallel Z-blocks 188. The blocks have rear legs 190 on which another cam plate 192 is pivotally mounted by a pair of pins 194 in a rear plane adapting the cam plate 192 to be engaged by a pair of control pins 195 and 196 protruding from the front side of the control chain 64. The Z-blocks 188 are pivotally mounted intermediate the legs 186 and 190 thereof by a pair of shoulder screws 198 which are threaded in a supporting plate 200. The latter is mounted, as by screws 202, on bosses 204 on the right hand side wall of the housing 10, as viewed in Figures 2 and 3. A stop pin 206 is fixed to the supporting plate 200 for limiting the pivotal movement of the Z-blocks 188 in the counterclockwise direction, (Figure 2). A standard sprocket chain link 208 connects the pair of pins 184 to each other, and a similar link connects the pair of pins 194 to each other, the links 208 being held in place as by lock springs 210 (Figure 4).

An extension plate or arm 212 (Figure 2) at the rear of the Z-blocks 188 serves as an anchor for one end of a spring 214 having its other end attached to a cam arm 216 extending along the front side of the control chain 64, also for engagement by the pins 195 and 196 on the control chain 64, and fixed to a shaft 218 shown in Figures 1, 2 and 3, which is journaled in a bushing 220 in a boss 222 of the housing 10 and extends to the rear of the housing (Figures 1 and 3) where it carries releasable means for holding the thread against feeding, which means may be in the form of a fixed clamp roll 224 having a handle 226 and constitutes a part of the thread control and guide means 18.

The means 18 further comprises a leaf spring 228 riveted in a slot of a stud 230 fixed to the housing 10 and having a curved outer end disposed over a collar 232 eccentrically mounted on a socket head screw 234. The eccentricity of the collar 232 is provided so that adjustment may be effected in the distance moved by the clamp roll 224 to clamp the thread against the spring 228 as backed by the collar 232.

As seen in Figure 1, in placing the thread 76 through various parts of the machine to effect an initial tie, the thread 76 is extended from a thread package or case 236 on a spool 237 of the supply means 14 into a tray 238 of the moistening means 16, around and under a roll 240 in the tray 238, over an edge of the tray, and under a hook 242 which is secured to the housing 10, as by a screw 244. The roll 240 is slip fitted between opposite side walls of the tray 238 and has sloping end flanges 241 (Figure 9) maintaining the thread away from the space between the ends of the roll and the tray walls. The thread extends from the hook through a position between the clamp roll 224 and the leaf spring 228 on the collar 232, and extends from the latter to a position under a hook 246 which is secured to the housing 10, as by a screw 248. From the hook 246, the thread extends through the hollow rotative spindle 86 to have its leading end gripped between the arm 148 and the movable washer 154, as seen in Figure 18.

As seen in Figures 1, 2, 3, 9 and 17, the link length measuring and machine starting means or assembly 20 comprises a shaft 250 turnably supported between a bracket 252 secured to the housing 10 and a housing boss 254 through which the shaft 250 extends. Exteriorly and rearwardly of the housing, a sleeve 256 is mounted on the shaft 250 for slidable adjustment therealong and locking in adjusted position by a lock screw 258 adapted to engage a flat surface 260 in the shaft 250. An arm 262 (Figures 1 and 3), fixed to the sleeve 256 and extending radially from the shaft 250, has fixed to its outer end a member 264 of substantially V-shape having a side arm or handle plate 266 extending parallel to the shaft 250.

As seen in Figures 3 and 9, the distance between the tie gap 74 and the V-member 264 determines the lengths of the sausage links 80. When a tie has been made to form one of the constricted portions 79 at the gap 74, the sausage is pulled through the exit sleeve 72 until the portion 79 just made is over the V-member 264. This portion is then allowed to fall into the V-member so that the part of the sausage blank 78 opposite the tie gap 74 receives the next tie or constricted portion 79. By releasing the lock screw 258 and sliding along the shaft 250 the assembly 20 comprising the screw, the sleeve 256, the arm 262 and the V-member 264, the lengths of the sausage links 80 may be varied. As shown, the assembly 20 is adjusted to produce substantially the shortest links 80 producible in this instance. By sliding the assembly 20 to the right (Figure 9) or upwardly (Figure 3), the lengths of the links 80 may be made longer to any extent limited only by the position of the bracket 252 which may be varied.

Inside the housing 10, a plate 268, having somewhat the shape of the numeral 4 (Figures 2 and 17) is fixed to the shaft 250, and carries, at its front side, a stud 270 and a square headed pin 272. A spring 274 connected between the stud 270 and a stud 276 in a boss 278 of the housing 10 normally holds the plate 268 in its position of Figure 2. A push rod 280 has one end 282 (see also Figures 16 and 17) pivoted in the lever arm 56, and its other end 284 provided with an offset shoulder 286. A spring 288 is connected between the push rod 280, through a hole 290 therein, and a stud 292 in a boss 294 of the housing 10. The plate 268 has a depending portion 296 which engages the stud 292 in the positions of the parts shown in Figure 17.

Referring particularly to Figure 1, the thread supply means 14 comprises, in addition to the package 236, a bracket or rod 298 having a lower end length 300 screw threaded into a boss 302 of the housing 10 and held in place, as by a nut 304. The rod 298 has an upper lateral arm 306 terminating in a hook 308 for receiving an eye member 310 of the spool 237.

In operation, the motor 12 is operated continuously. Near the end of a previous cycle during which one of the constricted portions or ties 79 was formed, the pin 62 is in the position shown in dotted lines in Figure 9, where it is about to slide downwardly on the C-shaped end 58 of the cam lever arm 56. As the pin 62 so slides, it pushes through its control chain 64 and the control sprocket 34 (Figure 3) to disengage the clutch elements 44 from the clutch elements 42 and to place the stop shoe 50 in a path in which it engages the stop arm 52. This action stops all movements of the device, except of the motor 12, the pinion 24, the gear 28 and the clutch elements 42. With the machine in such condition, for tying the next constricted portion or tie 79, two conditions arise, either one of which may be effected, depending upon whether the next tie 79 is at the leading end of a sausage blank 78, or between succeeding links 80. If it is desired to first tie the leading end of the blank close to such end, and thereby to avoid scrapping an appreciable untied leading end length for return to the sausage batch, the leading blank end is inserted into the entrance sleeve 70 to a position partially in the exit sleeve 72 beyond the gap 74 just sufficient to effect a good tie, and is held by hand in such position. The handle 266 is then depressed, and operations occur, which are explained shortly hereinafter.

In preparing for the next tie, or any succeeding tie of a series of the sausage links 80, the sausage is thrust or pulled through the sleeves 70 and 72 until the next previous tie is in lateral register with the V-member 264 into which the constricted portion 79 of the tie is dropped, thus measuring the length of the next sausage link to be formed and placing a portion of the blank 78 opposite the gap 74. With the latter action accomplished, or while effecting it with the same motion of dropping or placing the constricted portion 79 in the V-member 264, the handle 266 is also depressed, as aforesaid.

Depressing of the handle 266, turns the shaft 250 clockwise, (Figure 2) against the action of the spring 274, and causes the square headed pin 272 to push the push rod 280. This action moves the lever arm 56 counterclockwise about the axis of its pivot pin 60 (Figures 2 and 17) to release it laterally from the pin 62 which, at the time, was holding the clutch means 40 declutched, whereupon the spring 48 (Figure 3) presses the clutch elements 44 (Figure 10) into engagement with the clutch elements 42, and the pin 62 rides around the inner periphery of the C-shaped upper end cam portion 58 (Figure 17). at the beginning of that action, the parts assume the positions shown in Figure 17, with the depending portion 296 of the plate 268 against the stop stud 292 and the push rod 280 disengaged from the square head nut 272 as pushed by the stud 270, when the pin 62 releases the clutch elements 44 for engagement with the clutch elements 42 and the pin 62 engages the inner periphery of the cam portion 58, as stated. As soon as the parts reach the position of Figure 17, with the handle 266 released, the plate 268 returns from its position of Figure 17 to its position of Figure 2, and the push rod follows that action from its position of Figure 17 to its position of Figure 2, as it is released to do so by the pin 62.

Just prior to release of the clutch elements 44 by the pin 62 for engagement with the elements 42, the parts of Figure 18 are in the position as indicated, the tip 118 not yet having passed from under the cam shoe 120. After the pin 62 releases the clutch elements 44 for engagement with the elements 42, the tip 118 is released from the cam shoe 120 at about the position thereof shown in Figures 2 and 13, whereupon the gripper 136 closes on the thread 76. Figure 19 illustrates the position of the parts just after the gripper 136 has gripped the thread and is pulling the thread to the left from the spindle 86. At about the time that the gripper 136 grips the thread, the leading control pin 195 engages the clamping cam arm 216 to release the clamp roll 224 (Figure 1) from the thread 76 on the spring 228, so that the thread can be pulled from the spool 237, and the trailing control pin 196 disengages the cam plate 192. Disengagement of the pin 196 from the plate 192, causes counterclockwise movement of the Z-blocks 188 about the axes of the shoulder screws 198 against the stop pin 206 under the action of the spring 214, thus releasing the cam shoe 120 from the collar 100 (Figure 19), thereby preventing the shoe from engaging the tip 118 to release the hook 136 from the thread during the four revolutions of the thread about the sausage through which it is operated, in this instance, in effecting the tie 79.

The thread gripper 136 advances to the left from the position of Figure 19 through the position of Figure 20, at which the long inner leg 151 of the element 150 is about to engage the thread 76, and the leading thread end has been pulled from the washer 154.

Figure 21 illustrates further advancement of the gripper 136, in which the long inner leg 151 has fully engaged the thread and pulled a length thereof from the supply 14, and is about to carry it to the position of Figure 22, wherein the rotative movement of the thread past the stripper 178 causes the latter to move the thread sidewise along the inner side of the stripper (Figure 8) towards the housing 10 and drops the thread completely from the element 150 to form slack in the thread, which is taken up about the sausage blank 78 by the time that the gripper 136 reaches its position of Figure 23.

As the thread is stripped from the element 150, or an instant thereafter, the control pin 196 moves to the left (Figure 2) beyond the end of the arm 216, whereupon the spring 214 moves the arm 216 counterclockwise to move the clamp roll 224, clockwise (Figure 1) to tightly clamp the thread.

At the position of Figure 23, the helical element 147 has moved the thread forwardly from the front of the machine, or to the left (Figure 14) over the front side of the inner end of the arm 148 under the washer 154, so that, as the arm 148 advances counterclockwise from the position of Figure 23, the thread is gripped under the washer 154 for the beginning of the next succeeding tie, as in Figures 18, 2 and 19. Also, by moving the thread forwardly out of its initial plane, the thread is in a position whereby it will not be engaged or interfered with by the gripper 136 during the second revolution of the latter.

Shortly to the left of the position of Figure 23, the hollow spindle 86 and the collar 100 are each about to begin a second revolution, during which, since the thread is at the front side of the arm 148, the thread is engaged by the short outer leg 149 of the element 150. This action increases the effective lever arm length of the arm 148 on the thread so that, as the arm passes upwardly to the right of the sausage blank 78 (Figure 24) the distance between the leg 149 and the center of the sausage is suddenly greatly increased, and the thread chokes the sausage to the diameter of the tie. Figure 24 illustrates the thread about to be severed by the knife 160 near the leg 149.

Figure 25 illustrates the parts at about the end of the second revolution, and the thread being cut between the tie and the gripper 136, but still having a leading length held by the gripper, and a length extending uncut from the supply 14 though the hollow spindle 86 to a position on the arm 148 under the washer 154 ready for the next tie as above stated.

From the position of Figure 25, the parts move through two more revolutions to give the thread two extra idle turns about the sausage, near the end of which the control pins 95 and 96 engage the cam plate 192 to return the cam shoe 120 to its position of Figures 2, 13 and 18, in which the tip 118 is engaged by the shoe 120, and the gripper 136 is opened to drop the leading thread end of the completed tie.

After this action, the pin 62 again engages the lever arm 56 to disengage the clutch elements 44 from the elements 42, which causes the stop shoe 50 to engage the stop arm 52, with the pins 95 and 96, and the cam tip 118 in the position of Figures 2 and 13, whereupon the tie just completed may be advanced through the sleeve 72 to the V-member 64 for measuring the length of the next sausage link 80, and to start the next succeeding operation by depressing the handle 266, as aforesaid.

From the foregoing description, it is apparent that a sausage link and tie forming machine has been provided, which is very effective in performing its function where the sausage cover is ineffective for forming the links by twisting. The machine has novel and advantageous features, such as, simultaneously rotating elements for directly effecting the tie, means against which the thread is moved for cutting, and a link-length measuring device effective to start the machine, and many other features to render the machine a distinct advance in its field. The machine is rugged in construction and can readily withstand any rough usage to which it may be subjected.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

I claim:

1. In combination, means including rotatable strand carrying means for positioning a strand about an object, and strand pulling means separately rotatable about an axis parallel to the axis of rotation of said carrying means for causing the strand to constrict the object.

2. The combination, in sausage link tie forming means, of means including rotatable thread carrying means for locating a thread about the sausage, and thread pulling means separately rotatable about an axis parallel to the axis of rotation of said carrying means for engaging the thread on an orbit traversing the orbit of said carrying means and causing the thread to choke the sausage and form the tie.

3. The combination, in sausage link tie forming means, of means including rotatable thread carrying means for locating a thread in position about the sausage, rotatable thread pulling means separately rotatable about an axis parallel to the axis of rotation of said carrying means for cooperating with said carrying means to cause feeding of the thread to said position, means separate from said carrying means for causing removal of the thread from said pulling means to provide slack in the thread, and means for holding the thread against feeding, said pulling means operating to tension the thread as it is so held and to cause the thread to choke the sausage in forming the tie.

4. The combination in sausage link tie forming means, of means including rotatable thread carrying means, for locating a thread about the sausage, pulling means for causing the thread to choke the sausage and form the tie, and means against which the thread is moved by said pulling means for severing the thread.

5. The combination, in a sausage link tie forming means, of means including rotatable thread carrying means for locating a thread about the sausage, thread pulling means for causing the thread to choke the sausage and form the tie, starting and stopping means for controlling the operation of said carrying and pulling means, and means including adjustable link-length measuring means operative for controlling the starting operation of said starting and stopping means.

6. The combination in sausage link tie forming means, of means including thread carrying means for positioning a thread about the sausage, thread pulling means for causing the thread to choke the sausage and form the tie, starting and stopping means for controlling the operation of said carrying and pulling means, and means including adjustable link-length measuring means operative for controlling the starting operation of said starting and stopping means.

7. The combination, in sausage link tie forming means, of means including thread carrying means for positioning a thread about the sausage, thread pulling means cooperating with said carrying means for causing feeding of the thread as it is so positioned, means separate from said carrying means for causing removal of the thread from a portion of said pulling means to provide slack in the thread, and means for holding the thread against feeding, said pulling means operating to cause the thread as it is so held to choke the sausage in forming the tie.

8. The combination in sausage link tie forming means, of means including thread stripper means, thread cutting means, releasable means for holding the thread against feeding, thread carrying means movable in an orbit about the sausage, thread pulling means including thread anchoring means and positioning means for moving the thread into position for anchoring by said anchoring means, said pulling means being movable in an orbit traversing said first orbit at one side of the sausage for pulling the thread when said holding means is released and for causing said stripper means to strip the thread from said pulling means to provide slack in the thread, and means for causing said holding means to hold the thread after said slack is provided, said pulling means operating after the thread is so held to move one portion of the thread into said anchoring means for anchoring thereby and to cause said cutting means to cut another portion of the thread.

9. The combination, in sausage link tie forming means, of a means including rotatable thread carrying means for locating a thread about the sausage, rotatable thread pulling means cooperating with said carrying means for causing feeding of the thread as it is so located, means against which the thread is moved for displacement from said pulling means to provide slack in the thread, means for clamping the slack thread, and thread severing means, said pulling means operating to cause the thread to choke the sausage to form the tie and to move the thread against said severing means for cutting thereby.

10. The combination, in sausage link tie forming means, of means including rotatable thread carrying means for locating a thread about the sausage, rotatable thread pulling means cooperating with said carrying means for causing feeding of the thread as it is so located, means against which the thread is moved for displacement from said pulling means to provide slack in the thread, means for clamping the slack thread, starting and stopping means for controlling the operation of said carrying and pulling means, and means including adjustable link-length measuring means operative for controlling the operation of said starting and stopping means.

11. The combination, in sausage link tie forming means, of a means including rotatable thread carrying means for locating a thread about the sausage, rotatable thread pulling means cooperating with said carrying means for causing feeding of the thread as it is so located, means against which the thread is moved for displacement from said pulling means to provide slack in the thread, means for clamping the slack thread, stationary thread-severing means, said pulling means operating to cause the thread to choke the sausage to form the tie and to move the thread to position for severing by said severing means, starting and stopping means for controlling the operation of said carrying and pulling means, and means including adjustable link-length measuring means operative for controlling the operation of said starting and stopping means.

12. The combination of driving means, operating means carrying control and operating elements, releasable connecting means between said driving and operating means, actuating means for said connecting means, sausage receiving means, a driven element movable relative to said receiving means, said operating and driven elements being operatively connected, movable thread receiving means, a second control element movable with said thread receiving means, said first and second control elements being operatively connected and including first and second control means, clamping means for stopping the reception of thread by said thread receiving means, operating means for said clamping means, said first and second control means being adapted to actuate said actuating and operating means, respectively, thread control means movable with said thread receiving means including thread anchoring and pulling means, thread gripping means movable by said driven element and adapted for operation by said second control means, means for displacing the thread from said pulling means, means for severing the thread, and means for operating said connecting means independently of said actuating means.

13. The combination of rotative driving means, rotative operating means carrying control and operating elements, a clutch biased toward clutching position connecting said driving and operating means, actuating means for said clutch, a sausage receiving sleeve, a driven element journalled on said sleeve, said operating and driven elements being operatively connected, a hollow rotative thread receiving spindle, a second control element fixed to said spindle, said first and second control elements being operatively connected and including first and second control means, clamping means for stopping the passage of the thread through said spindle, operating means for said clamping means, said first and second control means being adapted for cooperation with said actuating and operating means to release the clutch and to clamp the thread, respectively, thread control means on said spindle including thread anchoring and pulling means, releasable thread gripping means carried by said driven element and adapted for operation by said second control means, means for displacing the thread from said thread pulling means, means for severing the thread, and means for operating said clutch independently of said actuating means.

14. The combination of rotative driving means, rotative operating means carrying control and operating sprockets fixed to each other, a clutch between said driving and operating means, means biasing said clutch toward clutching position, stop means carried by said operating means, stationary stop means for cooperation with said first stop means for stopping said operating means when said clutch is released, movable clutch control means, sausage passageway sleeve means, a driven sprocket journalled on said sleeve means, an operating chain connecting said operating and driven sprockets, a hollow rotative spindle, a second control sprocket fixed to said spindle, a control chain connecting said first and second control sprockets, means for guiding thread through said spindle, clamping means for stopping the passage of thread to said spindle, actuating means for said clamping means, first and second control means carried by said control chain for cooperation with said clutch control means and said actuating means to release the clutch and to clamp the thread, respectively, thread control means on said spindle including thread end anchoring means and thread pulling means, thread gripping means carried by said driven sprocket and including an operating element, means operating in active position against said element for holding said gripping means released and operated by said second control means for movement out of said position, means for displacing the thread from said thread pulling means, means for severing the thread, and means for moving said clutch control means out of the path of said first control means.

15. The combination of driving means, operating means carrying control and operating sprockets, a clutch between said driving and operating means, means biasing said clutch toward clutched position, means responsive to release of said clutch for stopping said operating means, movable clutch control means, sausage receiving means, an operating chain connecting said operating and driven sprockets, a hollow rotative spindle, a second control sprocket fixed to said spindle, a control chain connecting said first and second control sprockets, means for supporting a supply of thread, means for wetting the thread, means for guiding the thread from said supply through said wetting means and from said wetting means through said spindle, and clamping means for stopping the feeding of thread to spindle, actuating means for said clamping means, first and second control element means carried by said control chain for cooperation with said clutch control means and said actuating means for releasing the clutch control means and said actuating means for releasing the clutch and clamping the thread, respectively, thread control means on said spindle including thread anchoring means and a thread pulling member having long and short arms, thread gripping means including a control member carried by said driven sprocket and biased toward thread gripping position, means cooperating in active position with said control member for releasing said gripping means and operated by said second control element means for movement out of said position, a stationary stripper for displacing the thread from said long arm, a stationary knife disposed on a path between said legs, and means including adjustable sausage link-length measuring means operative to move said clutch control means out of the path of said first control element means.

16. In a device for successively forming a plurality of constricting loops about an object, means including rotatable strand carrying means for positioning a strand about the object, rotatable strand pulling means for causing the strand to constrict the object and form the loop, and means for severing the strand against which the strand is moved by said pulling means, said pulling means including means for positioning the strand to start the formation of a succeeding loop.

HAROLD C. NOE.

REFERENCES CITED

The following references are of record in the file of this patent:

UNITED STATES PATENTS

| Number | Name | Date |
| --- | --- | --- |
| 2,096,972 | Matousek | Oct. 26, 1937 |
| 2,198,440 | Marchand | Apr. 23, 1940 |
| 2,409,652 | Workman | Oct. 22, 1946 |
| 2,416,859 | Vining et al. | Mar. 4, 1947 |

Certificate of Correction

Patent No. 2,510,997                          June 13, 1950

HAROLD C. NOE

It is hereby certified that error appears in the printed specification of the above numbered patent requiring correction as follows:

Column 9, lines 34 to 36, strike out "separately rotatable about an axis parallel to the axis of rotation of said carrying means for";

and that the said Letters Patent should be read as corrected above, so that the same may conform to the record of the case in the Patent Office.

Signed and sealed this 6th day of February, A. D. 1951.

[SEAL]

THOMAS F. MURPHY,
*Assistant Commissioner of Patents.*